United States Patent
Suga

(10) Patent No.: US 8,570,973 B2
(45) Date of Patent: Oct. 29, 2013

(54) WIRELESS COMMUNICATION SYSTEM, BASE STATION AND TRANSMITTING METHOD

(75) Inventor: Junichi Suga, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 558 days.

(21) Appl. No.: 12/257,330

(22) Filed: Oct. 23, 2008

(65) Prior Publication Data

US 2009/0109920 A1  Apr. 30, 2009

(30) Foreign Application Priority Data

Oct. 26, 2007 (JP) .................................. 2007-279320

(51) Int. Cl.
*H04W 4/00* (2009.01)

(52) U.S. Cl.
USPC .......................................... 370/330; 370/478

(58) Field of Classification Search
None
See application file for complete search history.

(56) References Cited

U.S. PATENT DOCUMENTS

| | | | |
|---|---|---|---|
| 5,230,082 A | 7/1993 | Ghisler et al. | |
| 2005/0030931 A1* | 2/2005 | Sung et al. | 370/342 |
| 2005/0195791 A1 | 9/2005 | Sung et al. | |
| 2007/0206561 A1* | 9/2007 | Son et al. | 370/346 |
| 2008/0285500 A1* | 11/2008 | Zhang et al. | 370/315 |
| 2009/0252048 A1* | 10/2009 | Liang et al. | 370/252 |
| 2010/0202543 A1* | 8/2010 | Raif et al. | 375/260 |

FOREIGN PATENT DOCUMENTS

| | | |
|---|---|---|
| JP | 2007-525929 | 9/2007 |
| KR | 10-222632 | 10/1999 |
| WO | 2007/053948 | 5/2007 |
| WO | 2008/045645 | 4/2008 |

OTHER PUBLICATIONS

IEEE Std802.16/2004, Air Interface for Fixed Broadband Wireless Access Systems, Oct. 1, 2004.
IEEE Std802.16e-2005 (Amendment and Corrigendum to IEEE Std802.16/2004), Air Interface for Fixed Broadband Wireless Access Systems, Amendment 2: Physical and Medium Access Control Layers for Combined Fixed and Mobile Operation in Licensed Bands, Feb. 28, 2006.
Mobile WiMAX—Part I:A Technical Overview and Performance Evaluation, Feb. 21, 2006.
Extended European Search Report with Written Opinion and Annex attached issued for corresponding European Patent Application No. 08167264.4, dated Jun. 28, 2011.
Eunkyung Kim et al:, "An Efficient Resource Allocation for TCP Services in IEEE 802.16 Wireless MANs", Vehicular Technology Conference, 2007. VTC-2007 Fall 2007 IEEE 66th, IEEE, PI, Sep. 1, 2007, pp. 1513-1517, XP031147660, ISBN: 978-1-4244-0263-2; [Ref.: EESR dated Jun. 28, 2011].
Notification of Reasons for Refusal issued for corresponding Japanese Patent Application No. 2007-279320 dispatched May 15, 2012 with English translation.

* cited by examiner

*Primary Examiner* — Jianye Wu
(74) *Attorney, Agent, or Firm* — Myers Wolin, LLC

(57) ABSTRACT

A wireless communication system in which a terminal selects a signal from a plurality of known signals and transmits the signal to the base station by any region in a region specified by the base station. The wireless communication system includes a setting unit that sets a region by a frequency range and a time interval as the region to be specified, wherein the region set by the setting unit and a region set by another neighboring base station have a same frequency range and a same time interval.

18 Claims, 18 Drawing Sheets

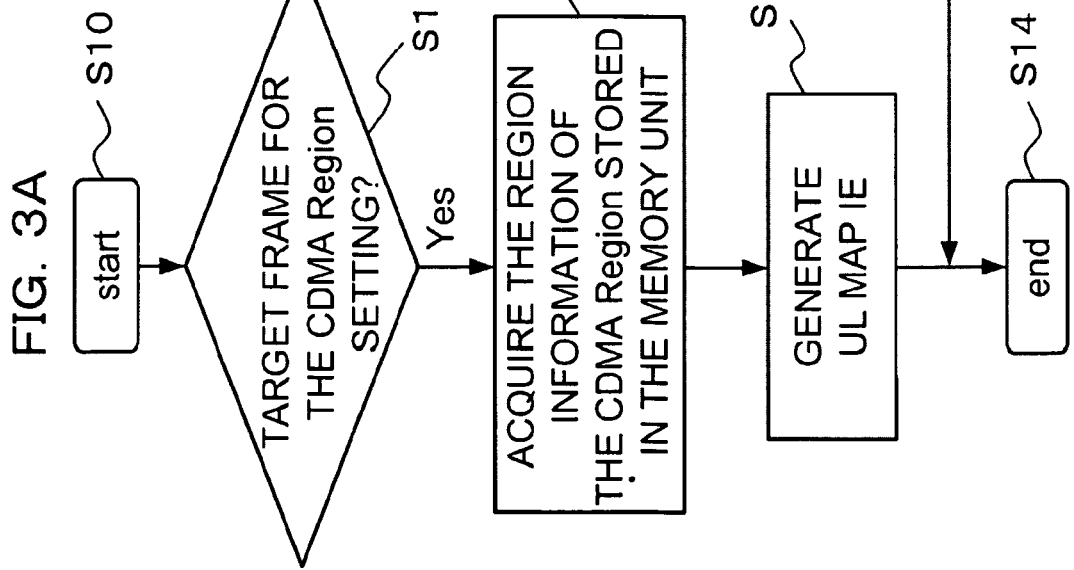

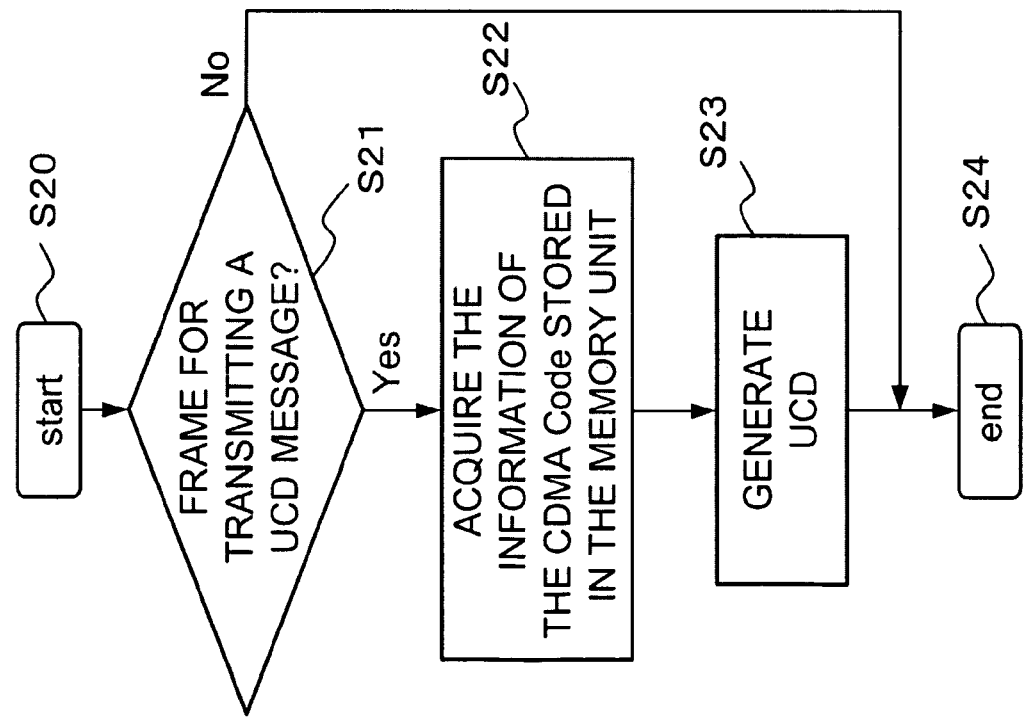

FIG. 11

| PARAMETER | BS1 | BS2 | BS3 |
|---|---|---|---|
| Start of ranging codes group (S) | 0 | 85 | 170 |
| Initial ranging codes (N) | 43 | 43 | 43 |
| Periodic ranging codes (M) | 42 | 42 | 42 |
| Bandwidth request codes (L) | 43 | 43 | 43 |
| Handover ranging codes (O) | 42 | 43 | 42 |

FIG. 15

| UL- MAP IE | | |
|---|---|---|
| Syntax | Size(bit) | Notes |
| CID | 16 | |
| UIUC | 4 | 12 |
| CDMA ranging | | |
| Syntax | Size(bit) | Notes |
| OFDMA Symbol offset | 8 | |
| Subchannel offset | 7 | |
| No. OFDMA Symbols | 7 | |
| NoSubchannels | 7 | |
| Ranging Method | 2 | 0b00: Initial ranging over two symbols<br>0b01: Initial ranging over four symbols<br>0b10: BR/periodic ranging over one symbol<br>0b11: BR/periodic ranging over three symbols |
| Dedicated ranging indicator | 1 | 0 |

WIRELESS COMMUNICATION SYSTEM, BASE STATION AND TRANSMITTING METHOD

CROSS-REFERENCE TO RELATED APPLICATIONS

This application is based upon and claims the benefit of priority of the prior Japanese Patent Application No. 2007-279320, filed on Oct. 26, 2007, the entire contents of which are incorporated herein by reference.

FIELD

Certain aspects of the present invention discussed herein are related to a wireless communication system, a base station, and a transmitting method.

BACKGROUND

Certain aspects of the present invention relate to a wireless communication system for the purpose of expanding the region for transmitting data from a terminal. Several currently accepted standards exist to enhance wireless communication methods. Examples of these wireless communication methods between a base station device (hereinafter referred to as a base station BS (Base Station)) and a terminal device (hereinafter referred to as a terminal MS (Mobile Station)) are the wireless standards 802.16d (e.g., Non-Patent Document "IEEE Std 802.16TM-2004") and 802.16e (e.g., Non-Patent Document "IEEE Std 802.16eTM-2005").

FIG. 1 is an example of a service of the communication method by the wireless standards 802.16d or 16e. A single base station BS 100 is connected to a plurality of terminals MS 200-1 to 200-3. The communication method by 802.16d or 16e is based on a P-MP (Point-to-Multipoint) connection.

FIG. 14 is a configuration example of a frame in the 802.16d or 16e standard. The vertical axis indicates the frequency, and the horizontal axis indicates the time. Each frame includes a DL (Down Link) sub-frame and a UL (Up Link) sub-frame. Configuration information of the DL sub-frame and the UL sub-frame and information for communication control are described in a DL-MAP and a UL-MAP in the DL sub-frame. The terminal MS which has received the DL sub-frame from the base station BS performs reception processing and transmission processing by referring the DL-MAP and the UL-MAP.

Further, a Code Division Multiple Access (CDMA) region is set to the UL sub-frame. The terminal MS selects one of 256 code patterns called CDMA codes, then transmits the code to the base station BS in this region. The CDMA codes are categorized according to their purpose: Initial Ranging, Periodic Ranging, Bandwidth Request, and Handover Ranging. The 256 patterns of the CDMA codes can be divided into these four groups.

A position of this CDMA region is specified by a UL-MAP IE (Information Element) in the UL-MAP of the DL sub-frame. Further, a purpose of the CDMA region is specified by the UL-MAP IE at the same time. FIG. 15 is an example of the UL-MAP IE. The position of the CDMA region is specified by "OFDMA Symbol offset," "Subchannel offset," "No. OFDMA Symbols," and "No. Subchannels." That is, an offset from the start of the UL sub-frame to the start position of the CDMA region is specified by "OFDMA Symbol offset" in the time direction and "Subchannel offset" in the frequency direction. The number of symbols and subchannels in the CDMA region are specified by "No. OFDMA Symbols" in the time direction and "No. Subchannels" in the frequency direction, respectively.

Further, the purpose of the CDMA region is specified by a "Ranging Method." If "00" or "01" is specified by the "Ranging Method," the purpose of Initial Ranging and Handover Ranging are indicated. If "10" or "11" is specified, the purpose of Bandwidth Request and Periodic Ranging are indicated. For example, when the base station BS sets "00" as the "Ranging Method" and transmits the UL-MAP IE. If the terminal MS needs to perform the Initial Ranging, the terminal MS transmits the CDMA code indicating the Initial Ranging of the 256 patterns in the CDMA region of the UL sub-frame. Subsequently, the Initial Ranging is processed in the base station BS and the terminal MS.

In the wireless communication system, frequencies are assigned to each base station BS in view of interference, coverage, etc. FIG. 16A is an example of the arrangement of the base stations, and FIG. 16B is an example of frequency assignment. Each of frequency bands f1 to f3 is assigned to each of base stations, BS1 to BS3, respectively. Different frequency bands are used in neighboring base stations. In this case, since the frequency bands are divided into f1, f2 and f3, the frequency band that can be used in each base station is smaller than the total frequency (f1+f2+f3). However, since different frequencies are assigned to the neighboring base stations BS, interference is reduced and a wireless environment of the terminal MS existing at a cell edge is improved. Thus, more coverage can be secured than in the case that the same frequency is used in all the base stations.

One of the methods of frequency use in a wireless communication system based on the 802.16 d or 16e in WiMAX Forum (e.g., a non-patent document "Mobile WiMAX-Part I: A Technical Overview and Performance Evaluation (August, 2006)") is Fractional Frequency Reuse (FFR). FIG. 17A is an example of the arrangement of the base stations, and FIG. 17B is an example of the frequency assignment by FFR.

As depicted in FIG. 17B, the frame of each base station BS is divided into two time regions (R1 Zone and R3 Zone) in FFR. In one Zone (R1 Zone), all the frequency bands (f1+f2+f3) are assigned. In the other Zone (R3 Zone), different frequencies are assigned in the neighboring base stations. In the R1 Zone, throughput can be improved because many frequency bands can be used. In the R3 Zone, coverage can be secured, so that the FFR can improve the throughput and the coverage.

FIG. 18A is an example of an arrangement of the base stations, and FIG. 18B is an example of the UL sub-frame. As shown in FIG. 18B, when different frequencies are assigned in the neighboring base stations, part of the frequencies assigned by each base station BS is used in the CDMA Region of the UL sub-frame (FIG. 14). On the other hand, in FFR case in the CDMA Region, part of the frequency assigned in each base station BS is used in the R3 Zone.

However, even though the CDMA region is a region that is used for such purposes as Ranging and Bandwidth-Request of the terminal MS, a problem occurs. The region for transmitting data of the terminal MS becomes smaller because part of the frequencies assigned to the base station BS is used. If the region for transmitting data is small, the amount of data that can be transmitted is reduced. Thus, various services may be disrupted.

SUMMARY

Accordingly, the object of one embodiment of the invention is to provide a wireless communication system, a base station, and a transmitting method, in which a region for transmitting data of a terminal is expanded.

According to one aspect of the invention, a wireless communication system in which a terminal selects a signal from a plurality of signals and transmits the signal to the base station by any region in a region specified by the base station, includes a setting unit that sets a region by a frequency range and a time interval as the region to be specified, wherein the region set by the setting unit and a region set by another neighboring base station have the same frequency range and the same time interval.

In another aspect of the invention, a base station in a wireless communication system in which a terminal selects a signal from a plurality of known signals and transmits the signal to the base station by any region in a region specified by the base station, includes a setting unit that sets a region by a frequency range and a time interval as the region to be specified, wherein the region set by the setting unit and a region set by another neighboring base station have the same frequency range and the same time interval.

According to another aspect of the invention, a method used in a wireless communication system in which a terminal selects a signal from a plurality of known signals and transmits the signal to the base station by any region in a region specified by the base station, includes setting a region by a frequency range and a time interval as the region to be specified, wherein the region set by the setting unit and a region set by another neighboring base station have the same frequency range and the same time interval.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A is a flowchart of generating processing of UL-MAP IE;
FIG. 3B is an example of CDMA region information stored in a memory unit;
FIG. 9A is a flowchart of generating processing of a UCD message;
FIG. 9B is an example of the CDMA code information stored in the memory unit;
FIG. 11 is an example of the CDMA code information;
FIG. 15 is an example of a configuration the UL MAP IE.

DESCRIPTION OF EMBODIMENTS

Embodiments for carrying out present invention are described with reference to the figures.

Figure 1:
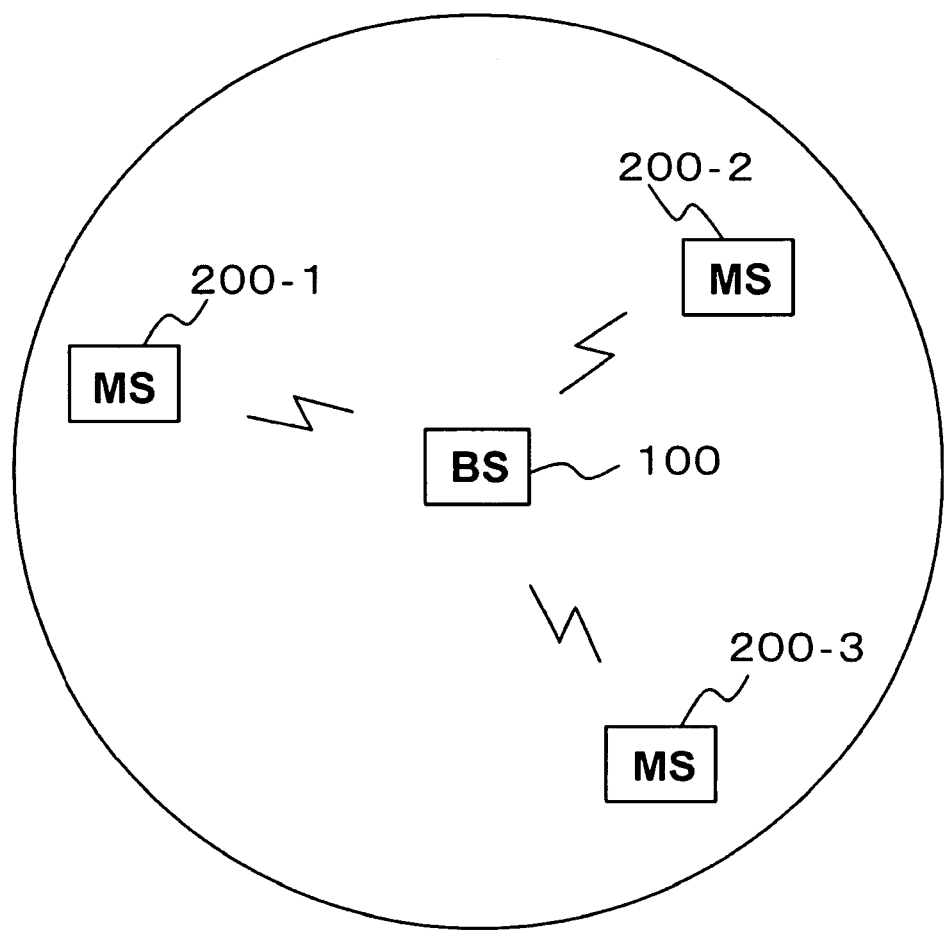
FIG. 1 is a configuration example of a wireless communication system.

FIG. 1 is an example of a wireless communication system 10 configuration. A base station BS 100 is connected to a plurality of terminals MS 200-1, 200-2 and 200-3 or more. Wireless communication is performed between the base station BS 100 and the terminals MS 200-1 to 200-3.

Figure 2:
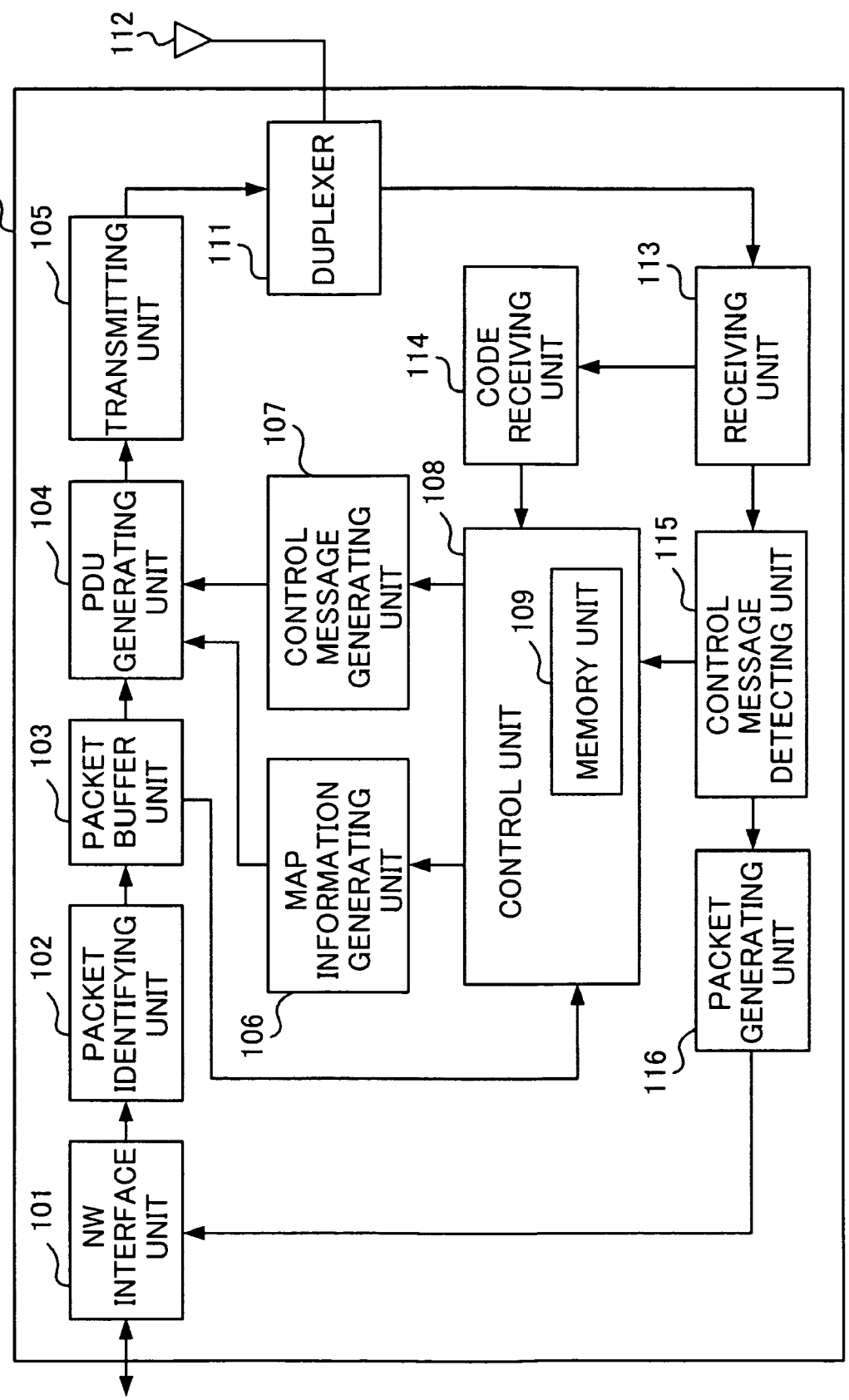
FIG. 2 is an example of a configuration of base station.

FIG. 2 is an example a configuration of the base station BS 100. The base station BS 100 includes an NW (Network) interface unit 101, a packet identifying unit 102, a packet buffer unit 103, a PDU (Protocol Data Unit) generating unit 104, a transmitting unit 105, a MAP information (example of communication control information) generating unit 106, a control message generating unit 107, a control unit 108, a duplexer 111, an antenna 112, a receiving unit 113, a code receiving unit 114, a control message detecting unit 115, and a packet generating unit 116. Further, the control unit 108 includes a memory unit 109.

The NW interface unit 101 receives and transmits information such as a packet from and to a network. The packet identifying unit 102 identifies a packet transmitted from the NW interface unit 101. The packet buffer unit 103 stores a packet transmitted from the packet identifying unit 102 temporarily.

The PDU generating unit 104 reads out the packet from the packet buffer unit 103 to generate a PDU (Protocol Data Unit). Further, the PDU generating unit 104 generates a PDU based on MAP information generated by the MAP information generating unit 106 and a control message generated by the control message generating unit 107.

The transmitting unit 105 performs a predetermined modulation or the like for the PDU from the PDU generating unit 104 and outputs the PDU to the duplexer 111. The signal subjected to the modulation and the like is wirelessly transmitted to the terminal MS 200 from the antenna 112 through the duplexer 111.

The MAP information generating unit 106 generates a UL-MAP (MAP information) in a wireless frame. The UL-MAP IE in which the CDMA region is specified is generated by the MAP information generating unit 106. The MAP information generating unit 106 generates a UL-MAP message including this UL-MAP IE and outputs the UL-MAP message to the PDU generating unit 104. The MAP information generating unit 106 is considered as an example of a setting unit which sets a region for transmission of signals from the terminals MS 200-1, 200-2 and 200-3. The terminals MS 200-1, 200-2 or 200-3 transmits a signal (for example CDMA code) selected from a plurality of signals to the base station by any region in the region set by the MAP information generating unit 106.

The control message generating unit 107 generates a control message to be transmitted to the terminal MS 200. A UCD (Uplink Channel Descriptor) message including information related to assignment of the CDMA code (hereinafter referred to as CDMA code information) is generated by the control message generating unit 107. The control message generating unit 107 outputs the generated UCD message to the PDU generating unit 104. Detailed description of the CDMA code information is made later.

The control unit 108 is connected to the MAP information generating unit 106, the control message generating unit 107 and controls the memory unit 109 controlling the input/output of information stored in the memory unit 109. In this example, the control unit 108 includes the memory unit 109 and the memory unit stores the CDMA region information, the CDMA code information, etc. The detailed description will follow.

Further, the wireless signal transmitted from the terminal MS 200 through the antenna 112 and the duplexer 111 is applied to the receiving unit 113. Then the receiving unit 113 performs demodulation and the like for the signal and outputs the signal to the code receiving unit 114 and the control message detecting unit 115.

The code receiving unit 114 receives and detects the CDMA code transmitted from the terminal MS as a signal to be transmitted by any region in the region specified by the UL-MAP IE and outputs the detected CDMA code to the control unit 108. Concurrently, if the code receiving unit 114 receives the code other than the CDMA code specified by the UCD message in the CDMA region specified by the UL-MAP IE, the code receiving unit 114 discards such a code. The details will be described later.

The control message detecting unit 115 detects a control message such as a MAC (Media Access Control) management message or the like is transmitted from the terminal MS 200. The detected control message is output to the control unit 108.

The data other than the control message is applied to the packet generating unit 116 from the control message detecting unit 115. The packet generating unit 116 converts the data into a packet that can be transmitted to the network and outputs the packet to the NW interface unit 101. The packet to be transmitted to the network may include control information also.

The following is a description of the wireless communication system 10 operations, including the base station BS 100 and the terminal MS 200 configured as described above.

Figure 4B:
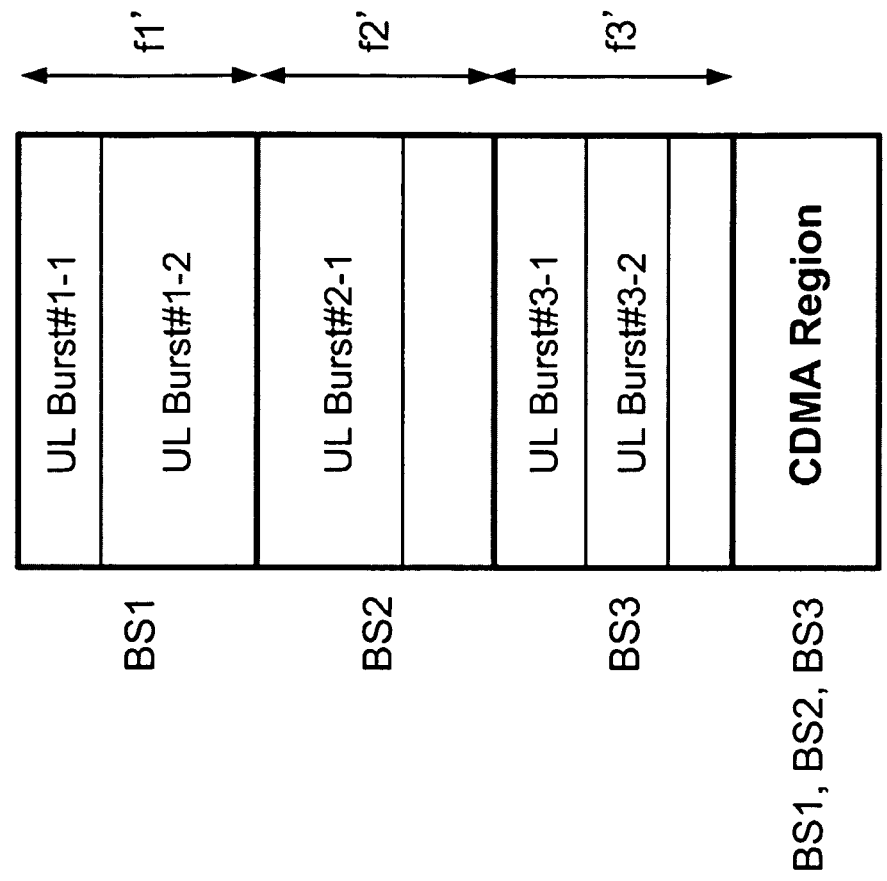
FIG. 4B is an example of a UL sub-frame.

In the present embodiment, the CDMA region in the UL sub-frame is shared by another (other) neighboring base station(s). That is, one or a plurality of neighboring base stations use the same time region (time interval) and the same frequency region (frequency range) as the CDMA region. For example, as shown in FIG. 4B, the neighboring base stations, BS1 to BS3, set the CDMA region to a shared time region (interval) and a shared frequency region (range) (or part thereof is overlapped), and the terminal MS transmits a CDMA code to the base station BS within this time region and frequency region. The CDMA region is specified by the MAP information generating unit 106 of the base station BS 100. This specification is performed by specifying "OFDMA Symbol offset," "Subchannel offset," "No. OFDMA Symbols," and "No. Subchannels" of the UL-MAP IE (see FIG. 15). That is, the shared CDMA region is indicated by the UL-MAP IE including such parameters generated by the MAP information generating unit 106.

The base station BS transmits the UL-MAP IE to the terminal MS. If necessary, the terminal MS transmits the CDMA code within the shared CDMA region. Then, other processes such as ranging are performed.

At this time, since the CDMA region is shared, the CDMA code transmitted to the connected base station BS can be received by the neighboring base station BS in the same time interval and in the same frequency as well. Specifically, if the terminal MS exists at a cell edge, the neighboring base station BS receives the CDMA code, and the neighboring base station BS may perform operations which are different from the conventional operations.

Figure 10:
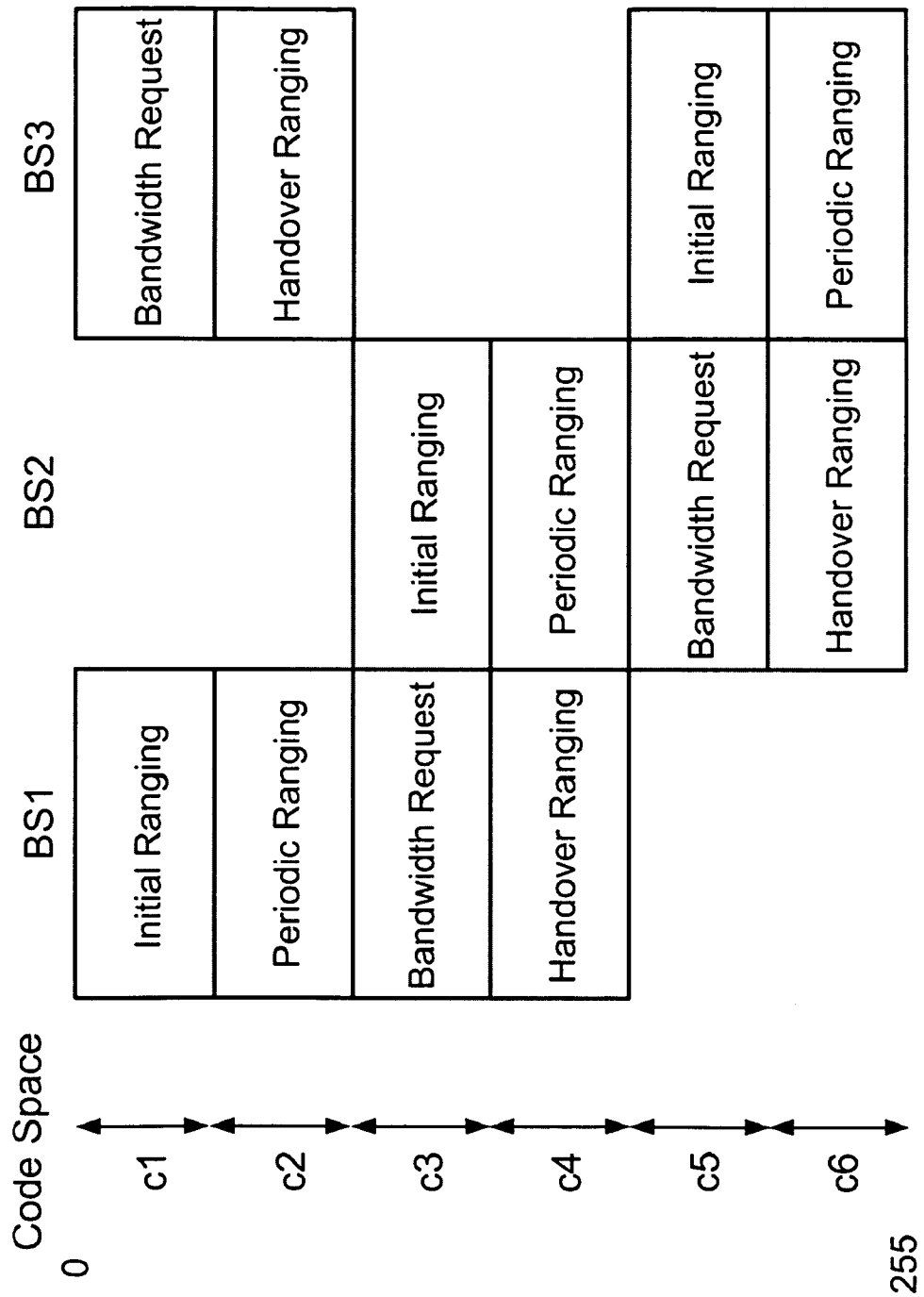
FIG. 10 is an example of assignment of the CDMA code.
Figure 12:
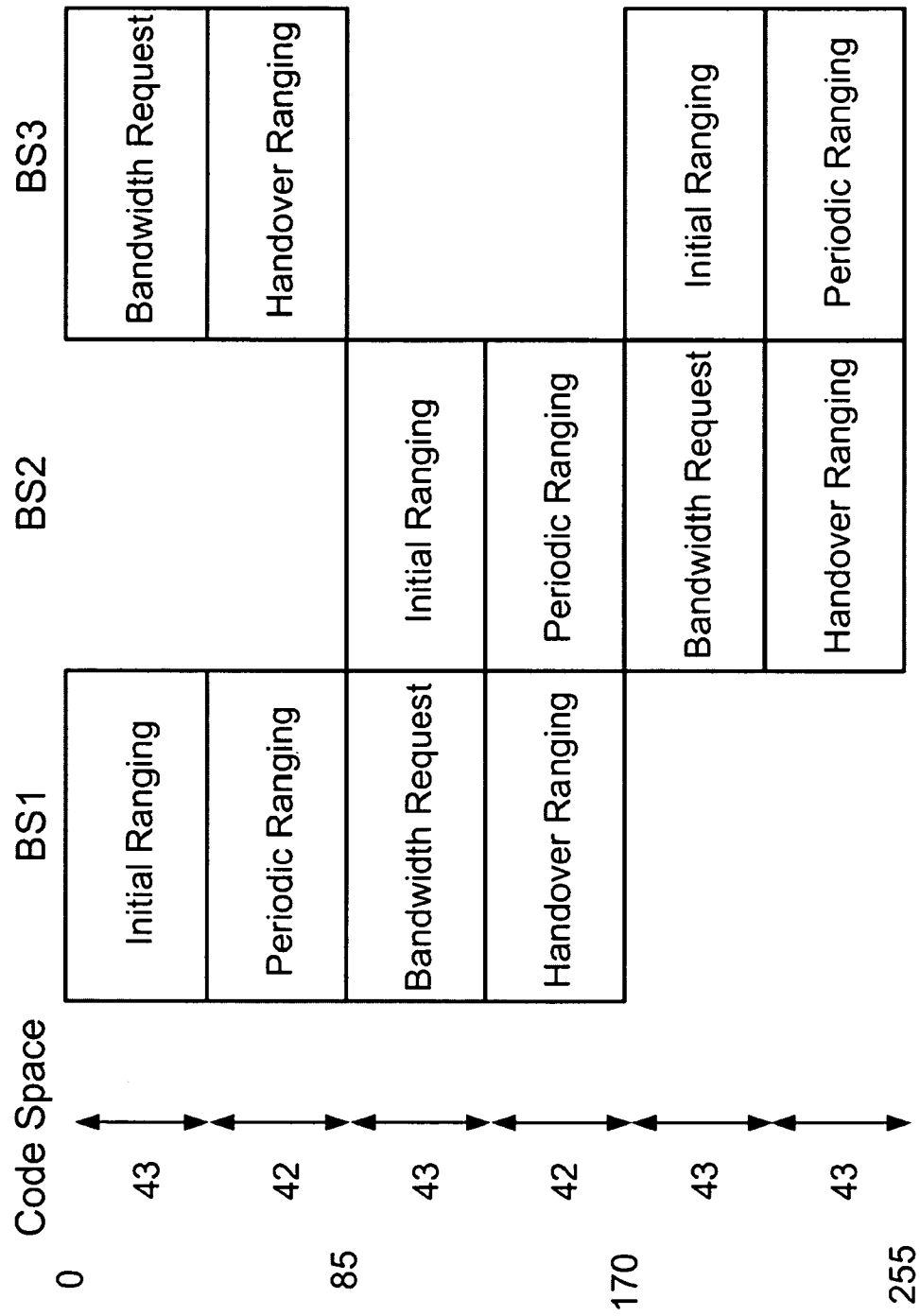
FIG. 12 is an example of assignment of the CDMA code.

Therefore, preferably, the present embodiment sets in such a way that a different CDMA code is used in the neighboring base station BS to avoid reception of the CDMA code from the terminal MS by the neighboring base station (see FIG. 10 to FIG. 12). The control message generating unit 107 of the base station BS 100, performs such settings by generating a UCD message with the CDMA code information inserted.

First, there is a description below of the process for generating the UL-MAP IE (generating the shared CDMA region). Then a description of the process for generating the UCD message follows (generating a different CDMA code in the neighboring base station).

Meanwhile, the terminal MS receives the UCD message in advance in order to acquire the CDMA code information (CDMA code(s) to be used) and then receives the UL-MAP IE to detect CDMA region in which the terminal MS transmits a CDMA code selected from the CDMA codes to be used. The generation of a UL-MAP IE will be described first.

"Generation of Shared CDMA Region"

FIG. 3A shows a flowchart of processing of generating the UL-MAP IE, and FIG. 3B is an example of CDMA region information stored in the memory unit 109.

When the MAP information generating unit 106 starts this processing (step S10), the MAP information generating unit 106 determines whether a frame to be processed is a target frame in which the CDMA region is set or not (step S11). For example, the MAP information generating unit 106 sequentially counts the numbers of the frame to determine whether or not the count value corresponds to the period for setting the CDMA region. The CDMA region information stored in the memory unit 109, "CDMA region setting period," is read out by the control unit 108 and outputs to the MAP information generating unit 106 by the control unit 108. Consequently, the MAP information generating unit 106 acquires a value of the period.

If the frame is not a target frame of the CDMA region setting (No in step S11), the MAP information generating unit 106 finishes the series of processes.

Figure 13:
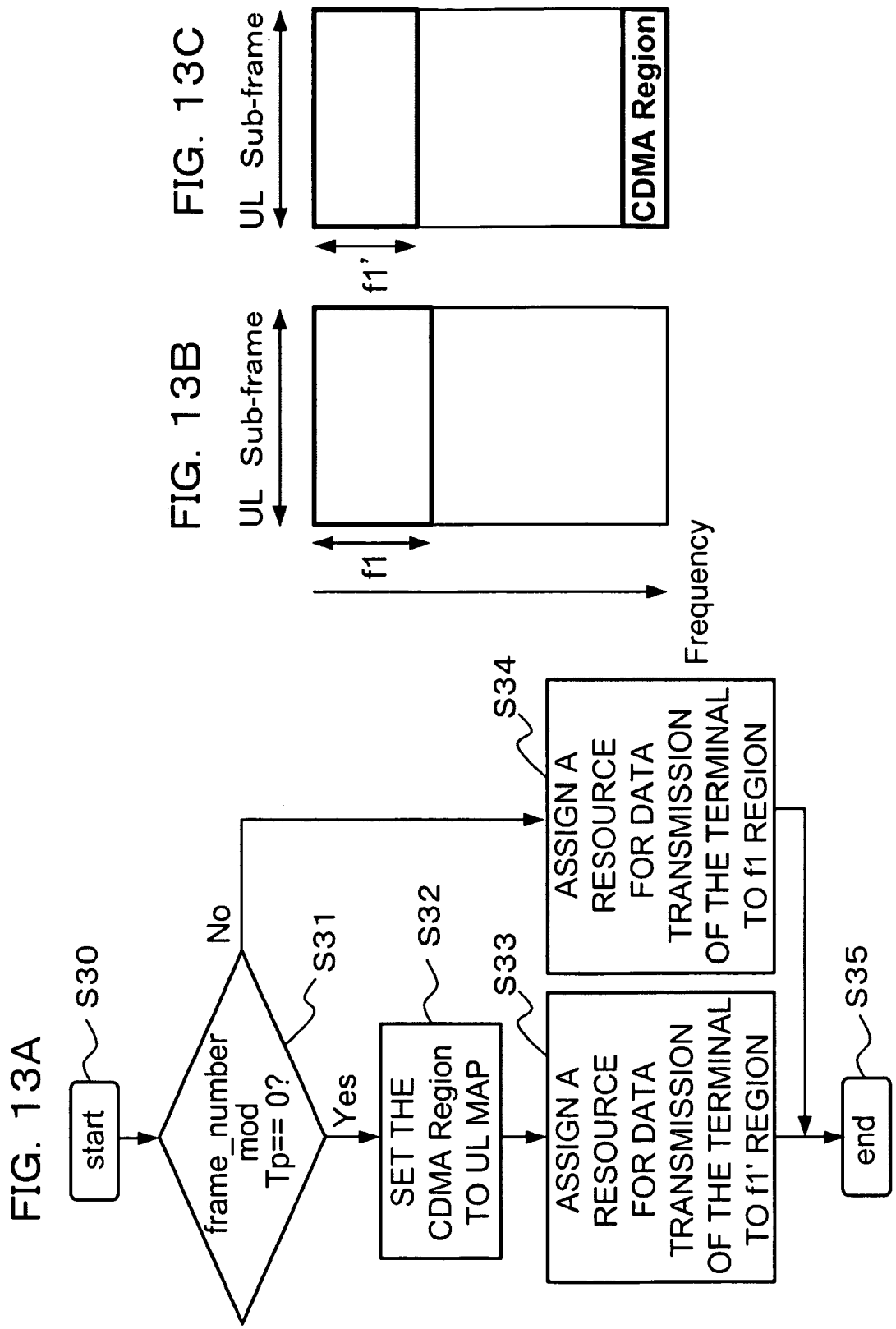
FIG. 13A is a diagram showing a flowchart of another generating processing of the UL MAP IE.
FIGS. 13B and 13C are examples of the UL sub-frame.
Figure 14:
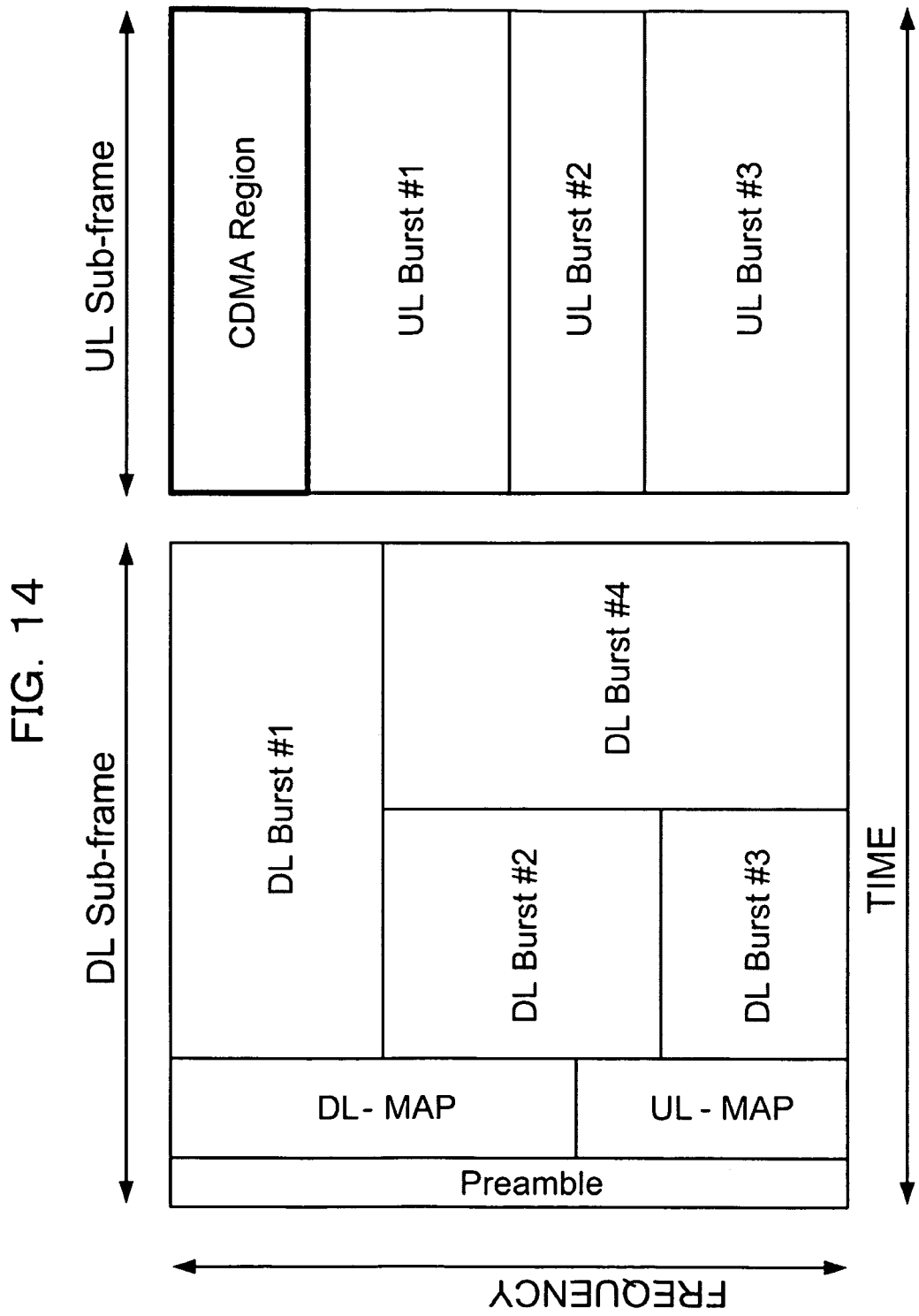
FIG. 14 is an example a configuration of a DL sub-frame and UL sub-frame.
Figure 16B:
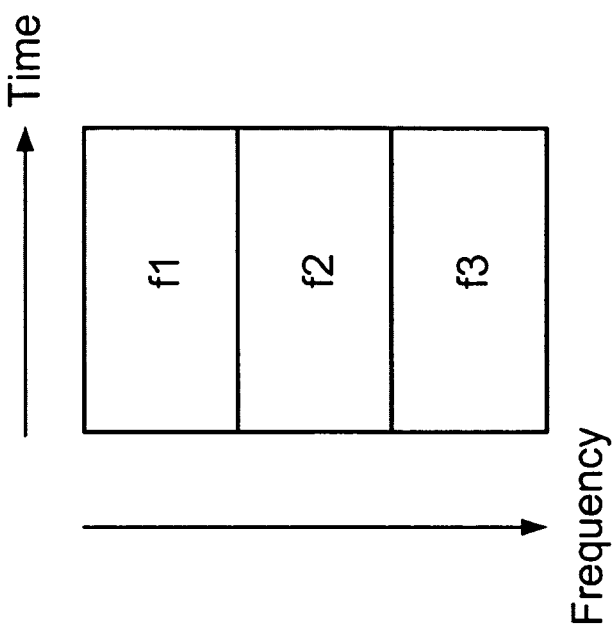
FIG. 16B is an example of assignment of frequency.
Figure 16A:
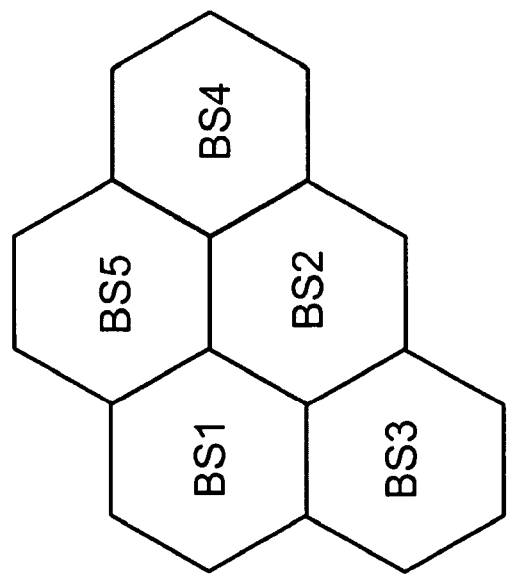
FIG. 16A is an example of arrangement of the base stations.
Figure 17A:
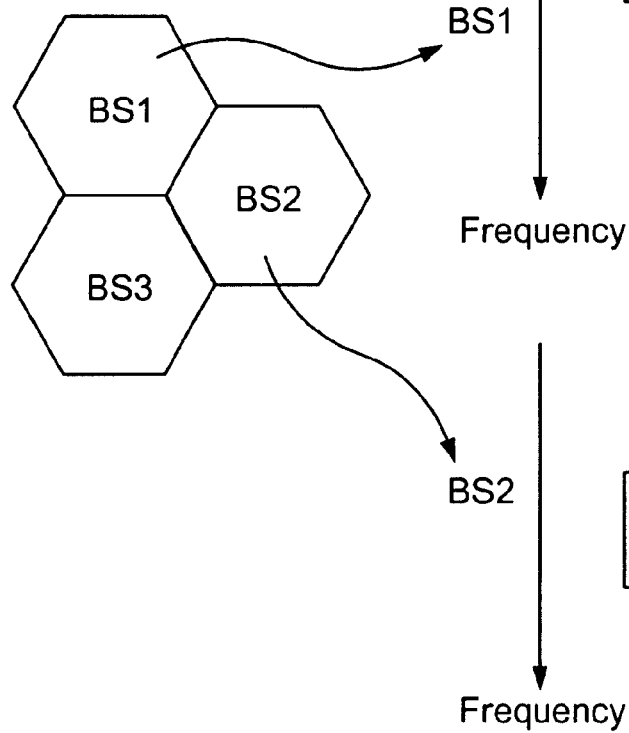
FIG. 17A is an example of an arrangement of the base stations.
Figure 17B:
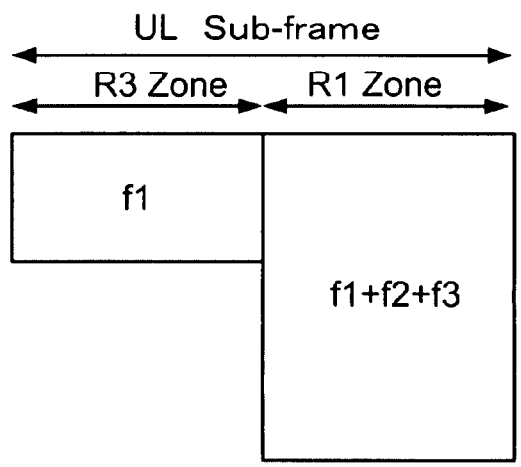
FIG. 17B and FIG. 17 C are configuration examples of the UL sub-frame.
Figure 17C:
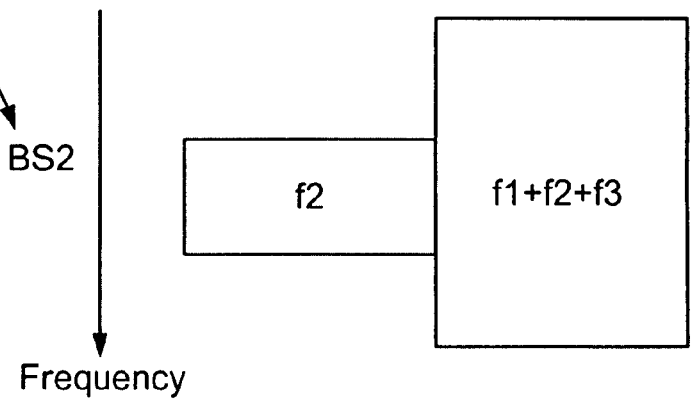

On the other hand, if the frame is a target frame of the CDMA region setting (Yes in step S11), the MAP information generating unit 106 acquires the information of the CDMA region stored in the memory unit 109 (the information from "OFDMA Symbol offset" to "No. Subchannels" in FIG. 13B) (step S12). The MAP information generating unit 106 generates the UL-MAP IE by which the values of these four parameters are specified. Further, the MAP information generating unit 106 of each base station BS synchronizes to generate and transmit the same CDMA region information to the terminal MS all at once. Consequently, the CDMA region shared in the UL sub-frame is set. This CDMA region information is set in the memory unit 109 by an operator of the system, for example.

Next, the MAP information generating unit 106 generates the UL-MAP IE (step S13). The MAP information generating unit 106 generates the UL-MAP IE shown in FIG. 15 as an example.

Then the MAP information generating unit 106 finishes the series of processes (step S14).

FIG. 4 to FIG. 8 are examples of the shared CDMA region. FIG. 4 and FIG. 5 are examples of the CDMA region when a different frequency band is assigned as the transmission band of burst data, excluding the CDMA region, wherein each transmission band is defined by respective MAP data transmitted by neighboring base stations 1 to 3.

Figure 6A:
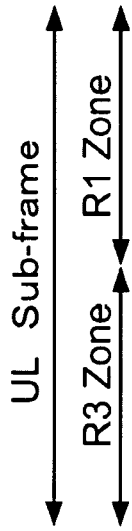
FIG. 6A is an example of an arrangement of the base stations.
Figure 6B:
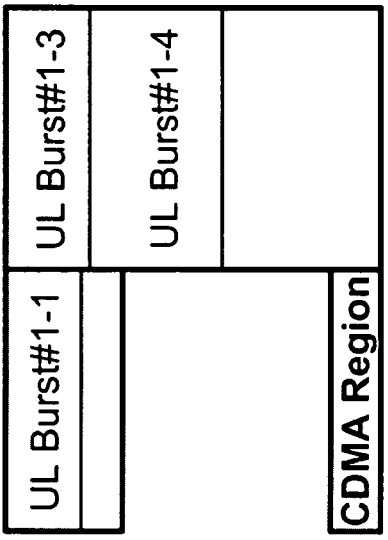
FIG. 6B and FIG. 6C are an example of the UL sub-frames.
Figure 6C:
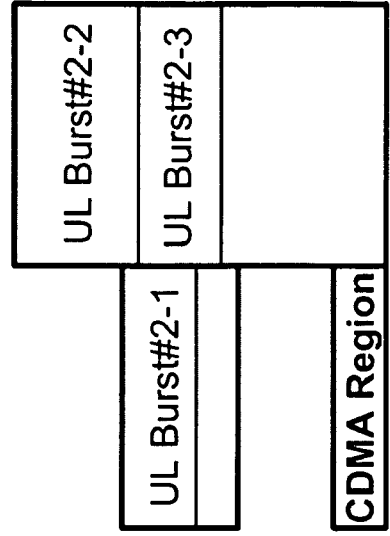
Figure 7B:
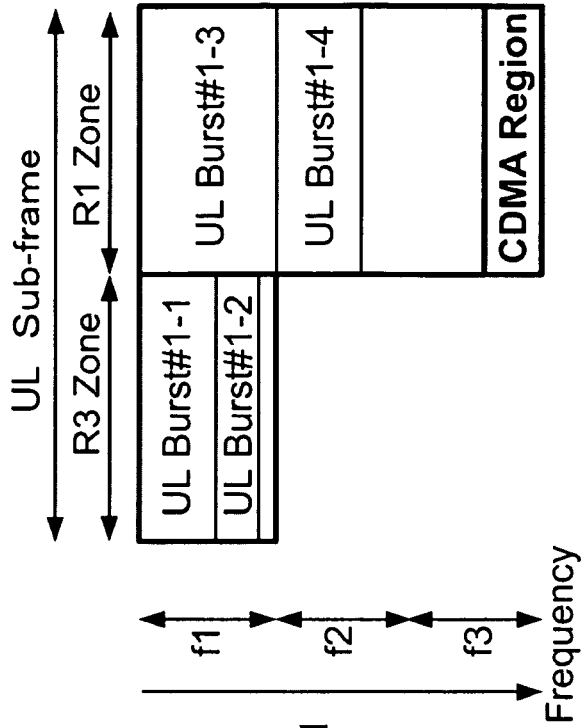
FIG. 7B and FIG. 7C are an example of the UL sub-frames.
Figure 7C:
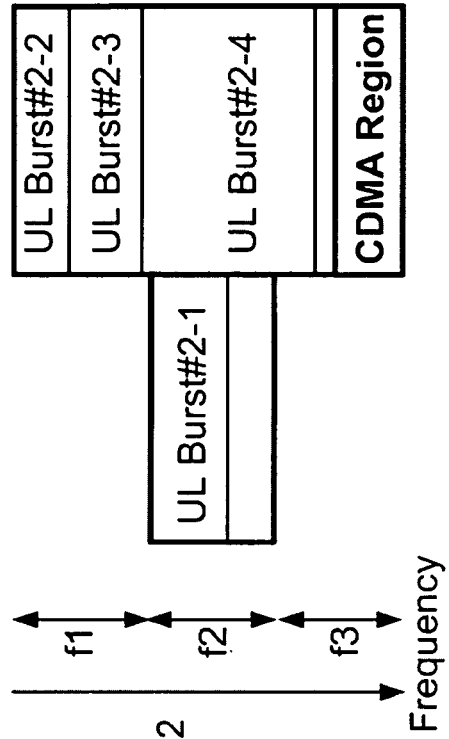

FIG. 6 to FIG. 8 are examples of the FFR. The CDMA region is a contention region by which any terminal MS can transmit a signal. The terminal MS selects one code of a plurality of known CDMA codes and transmits the code to the base station BS using any region of the CDMA region specified by the base station BS.

Figure 4A:
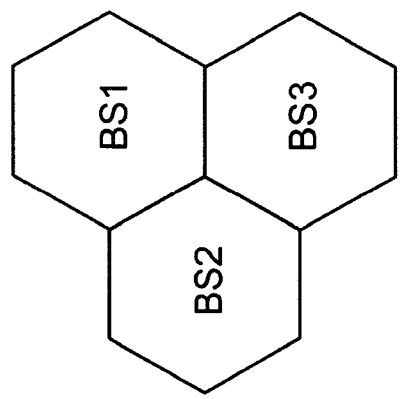
FIG. 4A is an example of an arrangement of base stations.

FIG. 4A is an example of an arrangement of the base stations, and FIG. 4B is an example of the UL sub-frame when the CDMA region is shared in a certain frequency band. The region other than the CDMA region is used as a data region, and the base stations, BS1 to BS3, are assigned frequency bands "f1'" to "f3'", respectively.

The following is a description of the expansion of the data region. For example, it is assumed that the CDMA region is assigned regions of six subchannels, and each of the base stations, BS1 to BS10, are assigned regions of ten subchannels (thirty subchannels in total). Focusing on the base station BS1, if the CDMA region is not shared (FIG. 18B), the data region is assigned four (=10−6) subchannels. Meanwhile, if the CDMA region is shared (FIG. 4B), the data region may be assigned eight subchannels (=(30−6)/3). Therefore, compared to the case where the CDMA region is not shared, the data region assigned to the base station BS1 is expanded if the CDMA region is shared. Thus, the CDMA region is assigned in the neighboring base station. At the same time, the region for transmitting data from the terminal MS is expanded by sharing the frequency region and the time region. As a result, throughput is improved and various services may become available.

The specification (designation) of the data region is performed by the UL-MAP IE as well in the specification (designation) of the CDMA region. In this case, the number of slots is specified to the terminal MS to be assigned the data region. For example, when the base station BS1 sets the CDMA region in a frame, the base station BS1 assigns the data region to the terminal MS within a range of the "f1'" which does not include the CDMA region.

Further, the CDMA region does not need to be provided in each frame in the UL sub-frame. This is because ranging and processing of band requests are not performed frequently. Thus, in each frame, the CDMA region may or may not be provided in the UL sub-frame.

Moreover, since the same region is used in each of the base stations, BS1 to BS3, for the time region in the CDMA region, to set the CDMA region each of the base stations, BS1 to BS3, takes the synchronization of the frame and transmits the UL-MAP IE. The examples of this process will follow.

Figure 5B:
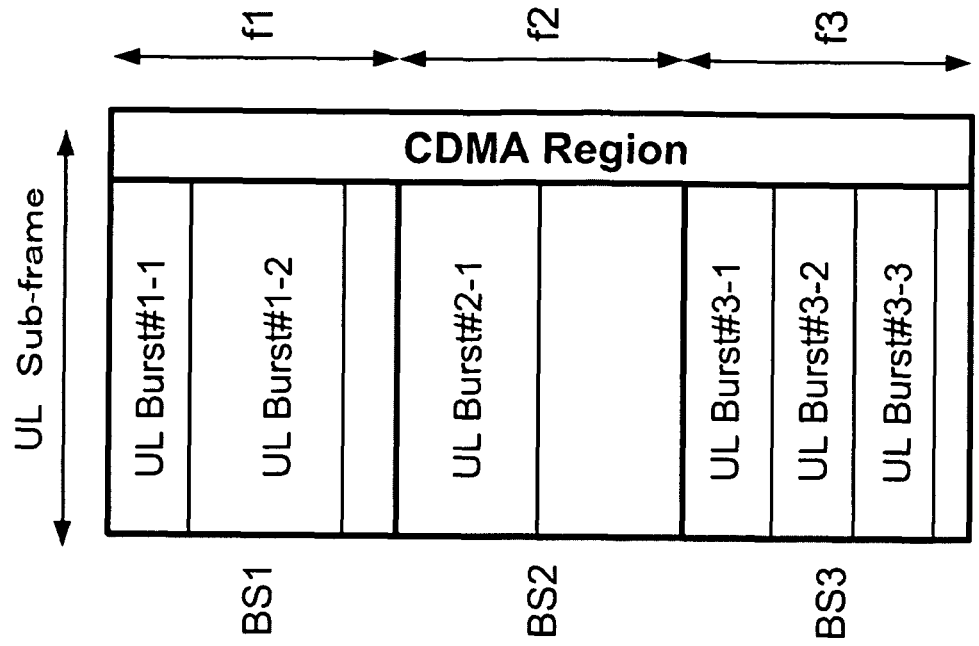
FIG. 5B is an example of the UL sub-frame.
Figure 5A:
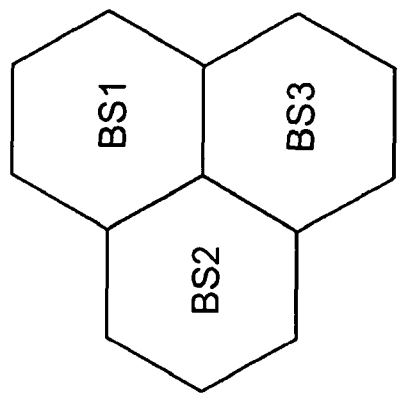
FIG. 5A is an example of an arrangement of base stations.
Figure 18B:
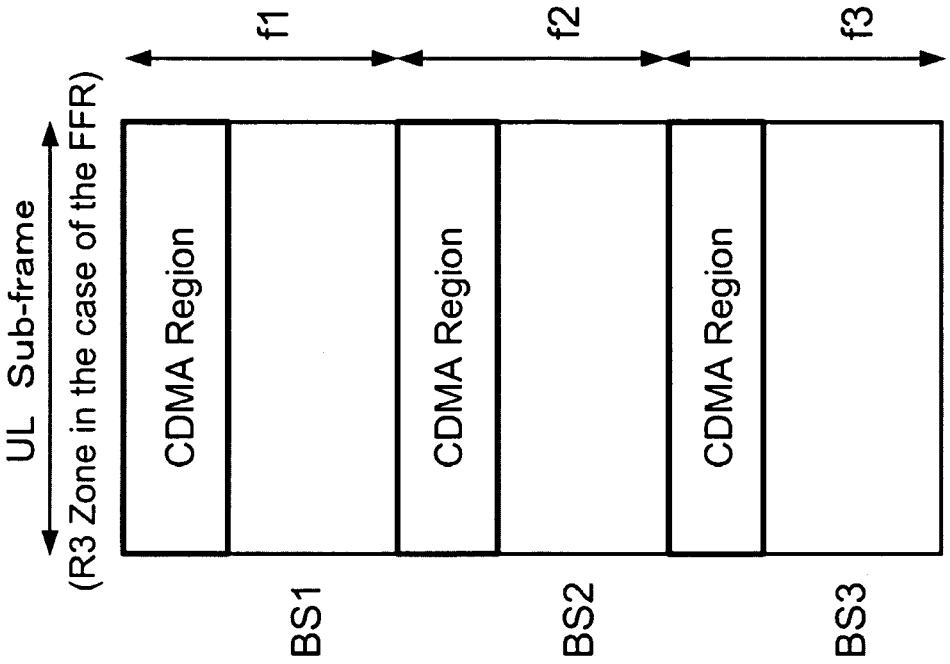
FIG. 18B is an example of a configuration of the UL sub-frame.
Figure 18A:
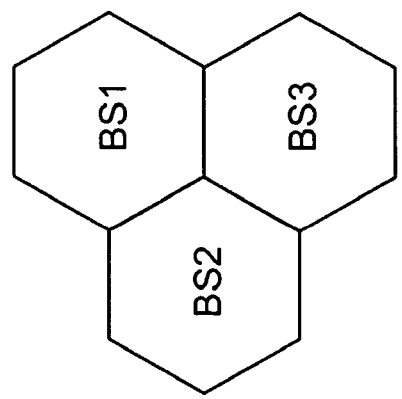
FIG. 18A is an example of an arrangement the base stations.

FIG. 5A is an example of a base station configuration and FIG. 5B is an example of the case where the shared CDMA region is provided in a certain time region by specifying such a time region in the UL-MAP IE. Also in this case, the data region (burst data region) of each of the base stations, BS1 to BS3, is expanded compared to the case where the CDMA region is not shared (FIG. 18B). The CDMA region is set over the entire frequency band by which the base stations BS1, BS2, and BS3 are used to transmit the burst data, but may be set to a part of the frequency band.

FIG. 6A also shows an example of a configuration of the base stations, and FIG. 6B an example of the UL sub-frame for the FFR case. The CDMA region is shared by the neighboring base stations, BS1 to BS3, to be assigned to a certain frequency band in an R3 Zone (a first period). As for the FFR, in a first period, a plurality of neighboring base stations transmit burst data by using different transmission bands. In a second period, the plurality of neighboring base stations share the transmission frequency band ("f1'" to "f3'" are shared in the figure).

Figure 7A:
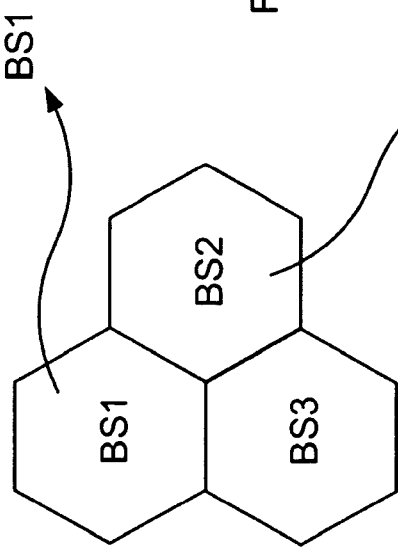
FIG. 7A is an example of an arrangement of the base stations.

FIG. 7A is an example of a configuration of the base stations and FIG. 7B is an example of the UL sub-frame for the FFR case. The CDMA region is shared by the neighboring base stations, BS1 to BS3, to be assigned to a certain frequency band in an R1 Zone (a second period). The terminal MS that can transmit the data only by the R3 Zone also transmits the CDMA code.

Figure 8B:
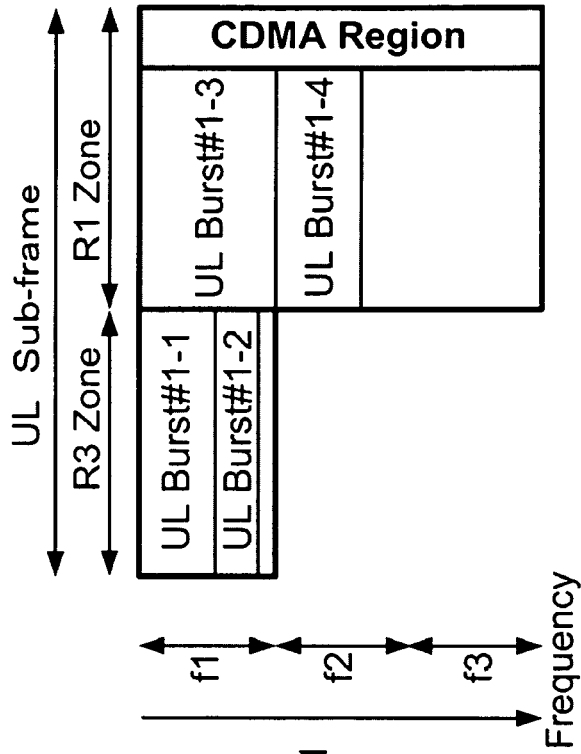
FIG. 8B and FIG. 8C are an example of the UL sub-frames.
Figure 8C:
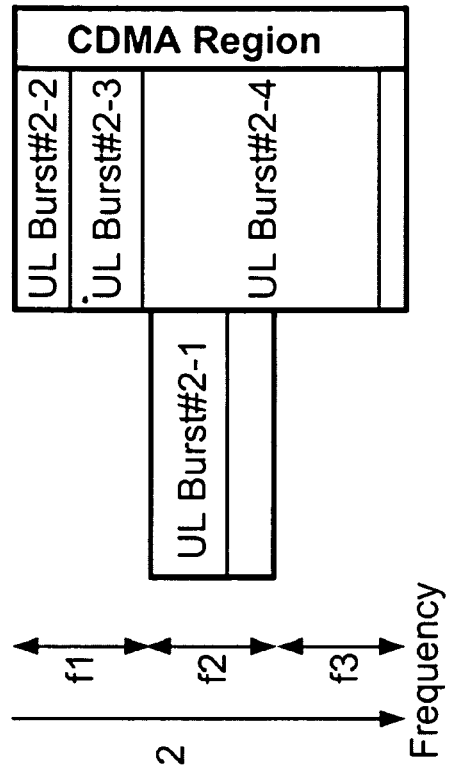
Figure 8A:
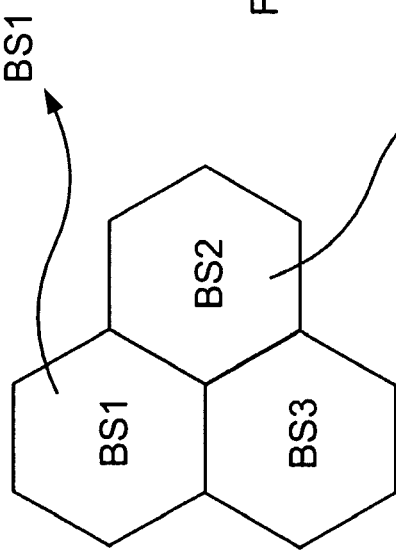
FIG. 8A is an example of an arrangement of the base stations.

Further, FIG. 8A is an example of a configuration of the base stations and FIG. 8B and FIG. 8C are examples of the UL sub-frames for the FFR case. The CDMA region is shared to be assigned to a certain time region of the R1 Zone (the second period).

"Assignment of CDMA Code"

The following is a description of assigning the CDMA code. As described above, the base station BS 100 assigns different CDMA codes that are known signals in the neighboring base stations, and transmits such information to the terminal MS by inserting the information into the UCD message.

As described above, there are 256 patterns of the CDMA code in total. The 256 patterns may be divided into ranges according to their purposes. The 256 pattern are divided into 4 groups: Initial Ranging, Periodic Ranging, Bandwidth Request, and Handover Request.

Initial Ranging indicates a process for adjusting transmission power and correcting a time axis deviation and a frequency deviation when the terminal MS is connected to the base station BS. Of the CDMA codes, Initial Ranging Code is a signal that is transmitted to the base station BS from the terminal MS in this processing.

Periodic Ranging is a process, periodically performed by the terminal MS, for adjusting the transmission power and correcting the time axis deviation and the frequency deviation. Periodic Ranging Code is a signal that is transmitted to the base station BS from the terminal MS in this processing.

Bandwidth Request is a signal that is first transmitted to the base station BS when the terminal MS connected to the base station BS requests for an assignment of an uplink band (toward the base station BS from the terminal MS).

Handover Ranging is a process for adjusting the transmission power and correcting the time axis deviation and the frequency deviation between the base stations at a handover destination when the terminal MS performs handover. Handover Ranging Code is a signal that is transmitted to the base station BS from the terminal MS in this processing.

FIG. 9A is an example of a process for generating the UCD message, including assignment information, and FIG. 9B is an example of the CDMA code stored in the memory unit 109.

When the control message generating unit 107 of the base station BS starts the present processing (step S20), it is determined whether or not the frame is a frame for transmitting the UCD message (step S21). For example, the control message generating unit 107 holds frequency information such as a frame and determines whether or not the counted number of the frames reaches the period.

If the frame is not a frame for transmitting the UCD message (No in step S21), the control message generating unit 107 finishes the series of processes (step S24).

Alternatively, if the frame is a frame for transmitting the UCD message (Yes in step S21), the control message generating unit 107 acquires the CDMA code information stored in the memory unit 109 (step S22), and generates the UCD message including the CDMA code information (step S23). Then the control message generating unit 107 finishes the series of processes (step S24).

As depicted in FIG. 9B, the CDMA code information may include five parameters in total. "Start of ranging codes group" indicates a top value of the range of the Ranging code to be used. "Initial ranging codes" indicates the number of the Initial ranging codes. "Bandwidth request codes" indicates the number of the Bandwidth request codes. "Handover ranging codes" indicates the number of the Handover ranging codes. Each of these parameters may be specified by each of the neighboring base stations. As depicted in FIG. 10, the base stations, BS1 to BS3, may assign the same CDMA code range to different purposes (four purposes: Initial ranging, Periodic ranging, Bandwidth request, and Handover Ranging), between the neighboring base stations, respectively. Alternatively, the same CDMA code range is assigned in such a way that the purposes to be used do not overlap the neighboring base stations.

The following is a description of specific examples. FIG. 11 is an example of the CDMA code information, and FIG. 12 is an example of the assignment of the CDMA code by such information. As depicted in FIG. 11, the base station BS1 indicates that "Start of ranging codes group" indicates "0," that is, the top value of the range is a code "0." The "Initial ranging codes" indicates "43." Thus, the codes from "0" to "42" are assigned to the base station BS1 as the Initial ranging code. Further, "Periodic ranging codes" indicates "42." Thus, 42 codes from the codes "43" to "84" are assigned to the terminal base station BS2 as the Periodic ranging code. Similarly, each ranging code or similar parameters are assigned in the same manner.

Further, in the base station BS2, "Start of ranging codes group" indicates "85," that is, the top value of the range of the CDMA code assigned to the base station BS2 starts from "85." Thus, 43 codes from the codes "85" to "127" are the Initial Ranging. Similarly, the codes are assigned as depicted in FIG. 12.

The base station BS1 is assigned the codes from "0" to "42" as the Initial Ranging. The base station BS3 is assigned the Bandwidth Request with respect to the same codes. In this manner, the neighboring base stations, BS1 to BS3, are assigned different purposes in the range of the same codes.

As depicted in FIG. 10 and FIG. 12, the same codes are assigned to different base stations. However, the purposes of the same codes assigned to a base station and the purposes of the same codes assigned to the neighboring base station are different. If the purpose of the same codes assigned to a base station is Initial ranging and Handover ranging (Ranging Method 00 or 01), the purpose of the same codes assigned to a neighboring base station is set as Bandwidth request and Periodic ranging (Ranging Method 10 or 11) (see FIG. 15).

Because of such assignment of the CDMA code, if the terminal MS transmits a CDMA code in a shared CDMA region and the neighboring base station receives such a code, the neighboring base station BS can discard the received code. This aspect is described below.

As described above, the shared UL-MAP IE in which the shared CDMA region is specified is synchronously transmitted from each of the neighboring base stations, BS1 to BS3.

Then, as shown in FIG. 15, the Ranging Method indicating the purpose of the CDMA region is specified by the UL-MAP IE. If there is a need to perform ranging specified by the Ranging Method, the terminal MS transmits a corresponding CDMA code to the base station BS in the CDMA region. The neighboring base stations, BS1 to BS3, synchronously transmit the shared UL-MAP IE, and some of the terminals MS under each of the base stations, BS1 to BS3, perform processes such as ranging.

For example, each of the base stations, BS1 to BS3, transmits the UL-MAP IE in which "00" is set as the Ranging Method to the terminal MS by synchronizing each of the base stations, BS1 to BS3. When the terminal MS under the base station BS1 performs the Initial Ranging, for example, the code "10" is set for the Initial Ranging and is transmitted to the connected base station BS1 in the shared CDMA region.

Meanwhile, if the neighboring base station BS2 receives the CDMA code of the code "10" from the terminal MS under the base station BS1, the neighboring base station BS2 discards the received code "10" because the code "10" is not assigned to the base station BS2 as shown in FIG. 12.

Further, if the neighboring base station BS3 receives the CDMA code of the code "10" from the terminal MS under the base station BS1, the received code "10" is the code for the Bandwidth Ranging as shown in FIG. 12 even though the Ranging Method "00" indicating Initial Ranging and Handover Ranging is specified and transmitted by the UL-MAP IE. Thus, the purpose specified by the Ranging Method of the UL-MAP IE and the purpose that the received CDMA code indicates do not correspond with each other. In such a case, the neighboring base station BS3 discards the received code.

This discarding processing is performed in the code receiving unit 114 of the base station BS 100 (see FIG. 2). That is, the code specified by the Ranging Method of the UL-MAP IE and the assigned CDMA code for each purpose are stored in the memory unit 109 by control of the control unit 108. The code receiving unit 114 reads out this information from the memory unit 109 and determines whether or not the received codes correspond with each other. If the received code corresponds to each of the codes, the code receiving unit 114 does not discard the received code.

"Another Embodiment"

FIG. 13A is a flowchart of the case for specifying the shared CDMA region by the UL MAP IE, and FIGS. 13B and 13C are examples of the UL sub-frames. This process is an example of the case when all the base stations BS synchronously set the CDMA region to the same frame.

As shown in FIG. 13A, when the MAP information generating unit 106 starts the processing (step S30), the number of the frames (frame number) is divided by the period (Tp), and it is determined whether or not a remainder is "0" (step S31). It is determined whether or not the counted number of the frames reaches the period (Tp) in all of the base stations BS.

If the remainder is "0", that is, if the counted number of the frames on the base station BS 100 reaches the period (Tp) (Yes in step S31), the shared CDMA region is specified by the UL-MAP IE (step S32), a resource of data transmission of the terminal MS is assigned in the f1' region that is assigned by the base station BS (step S33). Accordingly, as depicted in FIG. 13C, the shared CDMA region is assigned to the UL sub-frame (step S35). Then the MAP information generating unit 106 finishes the series of processes (step S35). The UL-MAP IE in which the CDMA region is specified is synchronously transmitted from all of the base stations BS to the terminal MS all at once.

On the other hand, if the remainder is not "0", that is, the counted number of the frames on the base station BS 100 does not reach the period (Tp) (No in step S31), the resource in the f1 region that is assigned by the base station BS is assigned for the data transmission of the terminal MS (step S34). In this case, as depicted in FIG. 13B, the CDMA region is not provided in the UL sub-frame. Then the MAP information generating unit 106 finishes the series of processes (step S35).

As described above, the CDMA region can be specified for each frame. However, the ranging processing or the like are not performed frequently. In the present embodiment, the base station BS 100 specifies the CDMA region by a certain period unit.

The example described above illustrates the case of three frequencies "f1" to "f3" (or "f1'" to "f3'") assigned to neighboring base stations, BS1 to BS3. This is because each cell is divided into three sectors based on directivity of the antenna of each of the base stations, BS1 to BS3. For example, as the division number becomes larger such as four and five, the kind of the frequency to be assigned accordingly increases such as four and five. Even in this case, however, the present embodiment is applicable. This is because there is no change in the fact that the CDMA region is shared by the neighboring base station and a different code is assigned to the neighboring base station BS.

Further, as in FIG. 4B or the other configuration examples, to specify the shared CDMA region by a certain frequency region and time region, as depicted in these figures, the CDMA region is provided in the region in which the frequency is high in the UL sub-frame (the area in the lower side in the figure) or in the region in which the time is behind (the area in the right side in the figure). However, it is applicable that the shared CDMA region is provided in an arbitrary frequency region and time region other than the region described above.

Moreover, the above described example is applicable to information equipment such as a terminal MS, a PDA or a personal computer as well as a mobile phone.

According to the embodiments mentioned above, it is possible to provide a wireless communication system, a base station, and a transmitting method, in which a region for transmitting data of a terminal is expanded.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A wireless communication system comprising:
   a base station configured to specify a contention region, which is included in an uplink (UL) subframe, by a frequency range and a time interval; and
   a terminal to select a signal from a plurality of known signals in accordance with a purpose of use of the signal and to transmit the signal to the base station by a part of the contention region specified by the base station;
   wherein the contention region specified by the base station and a contention region specified by a neighboring base station have a same frequency range and a same time interval, and the purpose of use of the signal for the base station is different from a purpose of use of the signal for the neighboring base station.

2. The wireless communication system according to claim 1, wherein the base station is further configured to generate a control message indicating said purpose of use of the signal for the base station.

3. The wireless communication system according to claim 1, wherein the frequency range is not used by the base station and the neighboring base station for uplink burst data transmission.

4. The wireless communication system according to claim 1, wherein the frequency range is used by neither the base station nor the neighboring base station for uplink burst data transmission in the time interval but is used by the base station or the neighboring base station for uplink burst data transmission in another time interval.

5. The wireless communication system according to claim 3, wherein the base station specifies another frequency range for uplink burst data transmission with respect to the base station, wherein the another frequency range is not overlapped with a frequency range for uplink burst data transmission with respect to the neighboring base station.

6. The wireless communication system according to claim 4, wherein the base station specifies a part of the frequency range as a frequency range to be used for uplink burst data transmission with respect to the base station.

7. The wireless communication system according to claim 1, wherein the frequency range is set in a first time interval in which common frequency is not used by the base station and the neighboring base station for uplink burst data transmission not including transmission of the signal or
   in a second time interval in which a common frequency is allowed to be used by the base station and the neighboring base station.

8. The wireless communication system according to claim 1, wherein the frequency range is set in a second time interval in which a common frequency is allowed to be used by the base station and the neighboring base station.

9. The wireless communication system according to claim 1, wherein the base station is further configured to transmit information indicating the specified contention region to the terminal.

10. The wireless communication system according to claim 9, wherein the information is included in UL-MAP IE.

11. The wireless communication system according to claim 1, wherein the base station is further configured to transmit information indicating the specified contention region and the plurality of known signals and the purpose for use of the plurality of known signals to the terminal, and the terminal transmits the single signal selected from the plurality of known signals by the specified contention region when a purpose of a process to be performed by the terminal corresponds to the specified purpose.

12. The wireless communication system according to claim 11, wherein the information is included in a UL-MAP IE and a UCD message.

13. The wireless communication system according to claim 1, wherein the plurality of known signals is a plurality of CDMA codes.

14. A base station in a wireless communication system, the base station comprising:
   a transmitter configured to transmit control information that specifies a contention region, which is included in an uplink (UL) subframe, by a frequency range and a time interval; and
   a receiver configured to receive a signal that is selected from a plurality of known signals in accordance with a purpose of use of the signal by a terminal, and that is transmitted to the base station by a part of the contention region;

wherein the contention region specified by the base station and a contention region specified by a neighboring base station have a same frequency range and a same time interval, and the purpose of use of the signal for the base station is different from a purpose of use of the signal for the neighboring base station.

15. A transmitting method used in a wireless communication system, the transmitting method comprising:

specifying a contention region, which is included in an uplink (UL) subframe, by a frequency range and a time interval; and receiving a signal that is selected from a plurality of known signals in accordance with a purpose of use of the signal by a terminal, and that is transmitted to the base station by a part of the contention region;

wherein the contention region specified by the base station and a contention region specified by a neighboring base station have a same frequency range and a same time interval, and the purpose of use of the signal for the base station is different from a purpose of use of the signal for the neighboring base station.

16. The method according to claim 15, wherein the frequency range is not used by the base station and the neighboring base station for uplink burst data transmission.

17. The method according to claim 16, further comprising:

specifying another frequency range for uplink burst data transmission with respect to the base station, wherein the other frequency range is not overlapped with a frequency range for uplink burst data transmission with respect to the neighboring base station.

18. The method according to claim 15, wherein the frequency range is used by neither the base station nor the neighboring base station for uplink burst data transmission in the time interval but is used by the base station or the neighboring base station for uplink burst data transmission in another time interval.

* * * * *